United States Patent
Lee (10) Patent No.: US 7,145,946 B2
(45) Date of Patent: Dec. 5, 2006

(54) MPEG VIDEO DRIFT REDUCTION

(75) Inventor: Hung-Ju Lee, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 857 days.

(21) Appl. No.: 09/916,490

(22) Filed: Jul. 27, 2001

(65) Prior Publication Data

US 2003/0026336 A1 Feb. 6, 2003

(51) Int. Cl.
*H04B 1/66* (2006.01)

(52) U.S. Cl. ............ 375/240; 375/240.25; 375/240.26; 375/240.2; 375/240.23; 375/240.16; 382/233; 382/235; 382/236; 382/238; 382/250

(58) Field of Classification Search ........... 375/240.03, 375/240.16, 240.24, 240.25, 240.61, 240.02, 375/240, 240.26, 240.2; 382/233, 235, 236, 382/238, 250, 251
See application file for complete search history.

(56) References Cited

U.S. PATENT DOCUMENTS

| | | | | |
|---|---|---|---|---|
| 5,262,854 A | * | 11/1993 | Ng | 375/240.24 |
| 5,614,952 A | * | 3/1997 | Boyce et al. | 375/240.01 |
| 6,307,888 B1 | * | 10/2001 | Le Clerc | 375/240.29 |
| 6,339,450 B1 | * | 1/2002 | Chang et al. | 348/470 |
| 6,456,661 B1 | * | 9/2002 | Morel | 375/240.16 |
| 6,498,814 B1 | * | 12/2002 | Morel | 375/240.12 |
| 6,671,322 B1 | * | 12/2003 | Vetro et al. | 375/240.16 |
| 6,697,428 B1 | * | 2/2004 | Morel | 375/240.03 |
| 6,904,094 B1 | * | 6/2005 | Liu et al. | 375/240.13 |

OTHER PUBLICATIONS

Digital VIdeo: An Introduction to MPEG-2, Haskell et al., Kluwer Academic Publishers, Norwell, MA, ISBN 0-412-08411-2, 1996 (or 1997—both dates listed), pp. 191-197.
P.A.A. Assuncao and M. Ghanbari, "Transcoding of MPEG-2 video in the frequency domain," IEEE International Conference on Acoustics, Speech, and Signal Processing, 1997. ICASSP—97.
P.A.A. Assuncao and M. Ghanbari, "Transcoding of single-layer MPEG video into lower rates," IEE Proceedings of Visual Image Signal Process, vol. 144, No. 6, Dec. 1997.
B. Sostawa, T. Dannemann and J. Speidel, "DSP-based transcoding of digital video singals with MPEG-2 format," IEEE Trans. On Consumer Electronics, vol. 46, No. 2, May 2000.
O. Alshaykh and H. Chen, "Minimum-Drift Digital Video Downconversion," IEEE Trans. On Circuits and Systems for Video Technology. vol. 10, No. 6, Sep. 2000.

* cited by examiner

*Primary Examiner*—Shawn S. An
(74) *Attorney, Agent, or Firm*—Miller Patent Services; Jerry A. Miller (57) ABSTRACT

A drift reduction method and apparatus. Drift reduction is effected in an MPEG video transcoder by decoding dropped out pixels to form a drift reference frame. The quantization indices in the current macro-block are changed accordingly in a drift reduction process. The compensated quantized frame is then variable length coded to an MPEG bitstream.

12 Claims, 6 Drawing Sheets

MPEG VIDEO DRIFT REDUCTION

FIELD OF THE INVENTION

This invention relates generally to the field of MPEG (Moving Pictures Expert Group) Video. More particularly, this invention relates to a method and apparatus for drift reduction for transcoded MPEG video.

BACKGROUND OF THE INVENTION

MPEG video coding (as well as other forms of variable length video coding) is frequently used to compress video signals for transmission and/or storage with reduced transmission or storage requirements. For example, a 10-Mb per second MPEG video stream can often be reduced to a 4-Mb per second bitstream (or less) while retaining a high degree of image quality. In many instances, the degradation in image quality is practically imperceivable to the casual viewer at typical viewing distances.

MPEG coding utilizes a discrete cosine transforming process in the coding process. A frame of video is divided into blocks with each block being represented in part by a block of coefficients for a discrete cosine transform. The block of coefficients spans from low frequency coefficients to high frequency coefficients as the block is traversed from the upper left-hand corner to the lower right-hand corner of the block, as commonly depicted. In order to compress the block, it is common for high frequency coefficients in the block to be dropped altogether since the human eye is least able to perceive the changes in the video signal represented by the high frequency coefficients. The more of these high frequency coefficients that are dropped, the greater the reduction in the bit rate, and thus the reduction in storage requirements or transmission requirements for the coded MPEG bitstream.

The process of dropping the higher frequency discrete cosine transform (DCT) coefficients is referred to as coefficient dropping. Coefficient dropping is used to effect bit rate reduction by reducing the high frequency content. Because these DCT coefficients have an inherent error by virtue of this form of bit rate reduction, a phenomenon known as drift can occur. Drift results because the reference frame used to form MPEG P and B frames in decoding is different from that used in the encoding process. This phenomenon of drift ultimately results in degraded image quality in the coded video signal. It is therefore desirable to minimize the amount of drift that occurs.

SUMMARY OF THE INVENTION

The present invention relates generally to MPEG video. Objects, advantages and features of the invention will become apparent to those skilled in the art upon consideration of the following detailed description of the invention.

In one embodiment consistent with the present invention a drift reduction method and apparatus is provided in which drift reduction is effected in an MPEG video transcoder by decoding dropped out pixels to form a drift reference frame. The quantization indices are changed in the current macroblock accordingly in a drift reduction process. The compensated quantized frame is then variable length coded to an MPEG bitstream.

A method of computing a drift reduction block for use in reducing drift in a block of quantized MPEG discrete cosine transform coefficients consistent with an embodiment of the present invention includes processing a block of discrete cosine transform coefficients by deleting at least one coefficient in the block; forming a dropped coefficient block containing the at least one coefficient; inverse quantizing the at least one coefficient to produce an inverse quantized dropped coefficient block; and inverse discrete cosine transforming the inverse quantized dropped coefficient block to produce the drift reduction block.

A method of computing a drift reduction frame for use in reducing drift in a frame comprising blocks of quantized MPEG discrete cosine transform coefficients consistent with an embodiment of the present invention includes for each block in the frame: processing a block of discrete cosine transform coefficients by deleting at least one coefficient in the block; forming a dropped coefficient block containing the at least one coefficient; inverse quantizing the at least one coefficient to produce an inverse quantized dropped coefficient block; and inverse discrete cosine transforming the inverse quantized dropped coefficient block to produce the drift reduction block.

A method of reducing drift in a block of quantized MPEG discrete cosine transform coefficients consistent with an embodiment of the present invention includes computing a drift reference block of discrete cosine transform coefficients; mapping the drift reference block to a block of quantized video coefficients, the block of quantized discrete cosine transformed video coefficients having at least one dropped coefficient using a motion vector; and adding the coefficients of the drift reference block to the coefficients of the block of quantized video coefficients that have not been blocked to form a drift compensated block.

A method of drift compensating a current frame of MPEG video, the current frame having a motion vector associated therewith, consistent with an embodiment of the present invention, includes dropping pixels from a reference frame of video; decoding the dropped pixels to form a drift reference frame; mapping a block of video from the current frame to a block in the drift reference frame; and compensating the block of video from the current frame using the block in the drift reference frame.

An MPEG transcoder having drift compensation that compensates a current frame of MPEG video, the current frame having a motion vector associated therewith, consistent with an embodiment of the present invention, has a processor for dropping pixels from a reference frame of video. A decoder decodes the dropped pixels to form a drift reference frame. A block of video from the current frame is mapped to a block in the drift reference frame. A drift compensator compensates the block of video from the current frame using the block in the drift reference frame.

An MPEG transcoder having drift compensation consistent with an embodiment of the present invention has a processor for forming a dropped coefficient block containing the at least one coefficient. An inverse quantizer inverse quantizes the at least one coefficient to produce an inverse quantized dropped coefficient block. An inverse discrete cosine transformer inverse discrete cosine transforms the inverse quantized dropped coefficient block to produce the drift reduction block.

Any of the above processes can be carried out on a programmed processor using instructions stored in any suitable electronic storage medium, or can be carried out in dedicated hardware.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail, specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
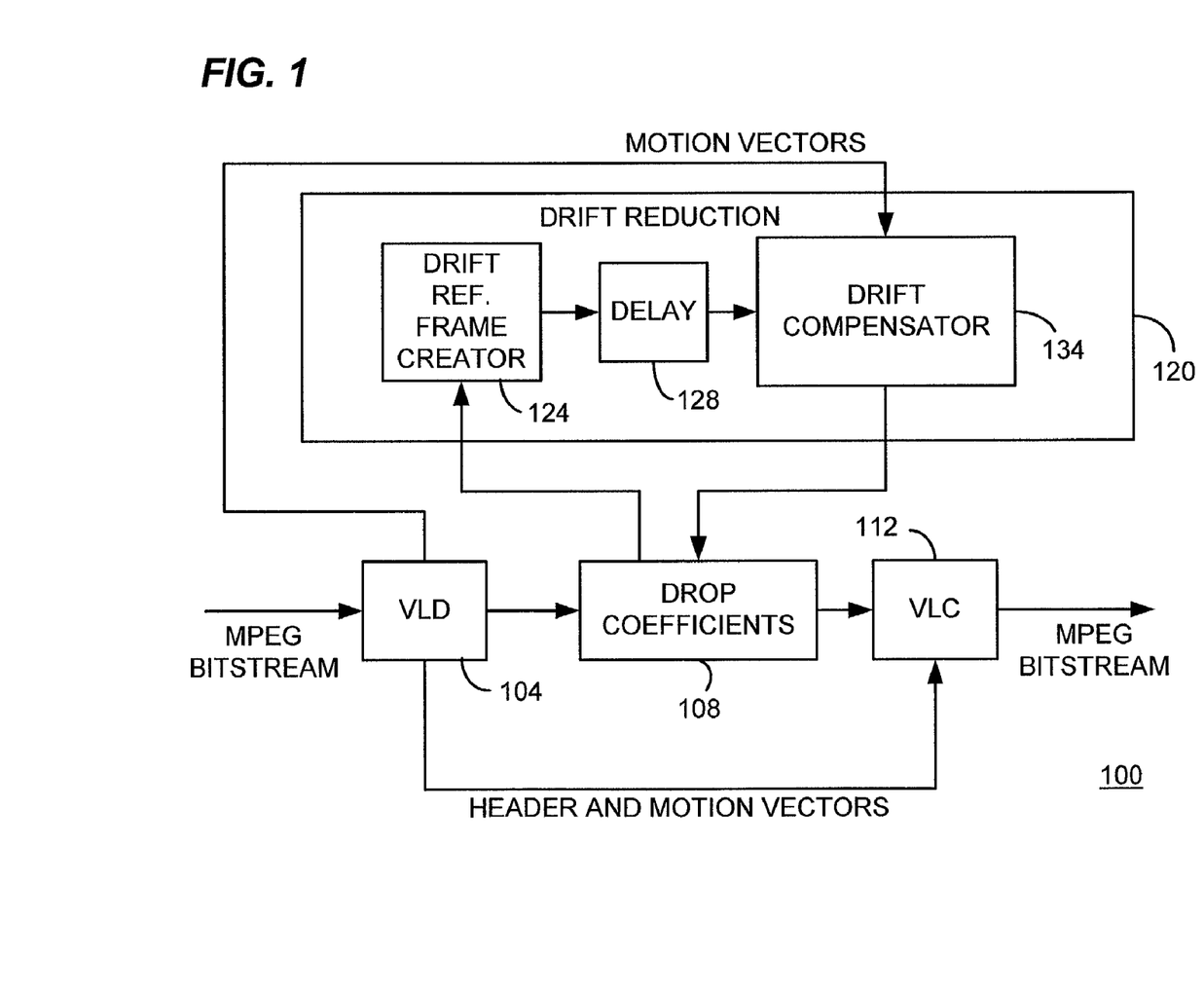
FIG. 1 is a block diagram of a drift reduction arrangement in an MPEG transcoder consistent with an embodiment of the present invention.

This invention relates to a drift reduction method and apparatus for open-loop MPEG video transcoding as shown in FIG. 1. Without loss of generality it can be assumed that the input video bitstream is generated by MPEG based coding scheme, i.e., motion compensated block-based DCT transform coding using transcoder 100. To summarize, by decoding the DCT coefficients dropped during transcoding, a drift reference frame is generated by drift reference frame creator 124. With this drift reference frame, drift errors can be reduced by changing the quantization index of the current video block (or macro-block). In other words, the new quantization index is refined to take the drift error into account. Note that since the present invention is based on an open loop solution, there is no need to do a motion search again. Instead, the same motion vector MV(x,y) normally generated in the MPEG coding process is applied. With the motion vector and the drift reference frame, the quantization indices can be changed to compensate for the drift.

With reference to FIG. 1 in greater detail, an MPEG transcoder 100 having a drift reduction arrangement is illustrated. In transcoder 100, an MPEG bitstream is received at a Variable Length Decoder (VLD) 104. The decoded MPEG bitstream appearing at the output of the variable length decoder 104 is applied to a coefficient dropping processor 108 that drops the higher frequency coefficients of each video block to produce a quantized frame of video. This quantized frame is then variable length coded at Variable Length Coder (VLC) 112 to produce a transcoded MPEG bitstream at the output. Header and motion vector information is fed forward from the variable length decoder 104 to the variable length encoder 112 to recreate the MPEG bitstream.

The present invention incorporates a drift reduction block 120 that creates a drift reference frame using a drift reference frame creator 124. This drift reference frame is then delayed by a delay 128. The drift reference frame is then applied as an input to a drift compensator 134. The drift compensator uses the drift reference frame to produce a drift compensated quantized frame that is sent to the variable length encoder 112.

Figure 2:
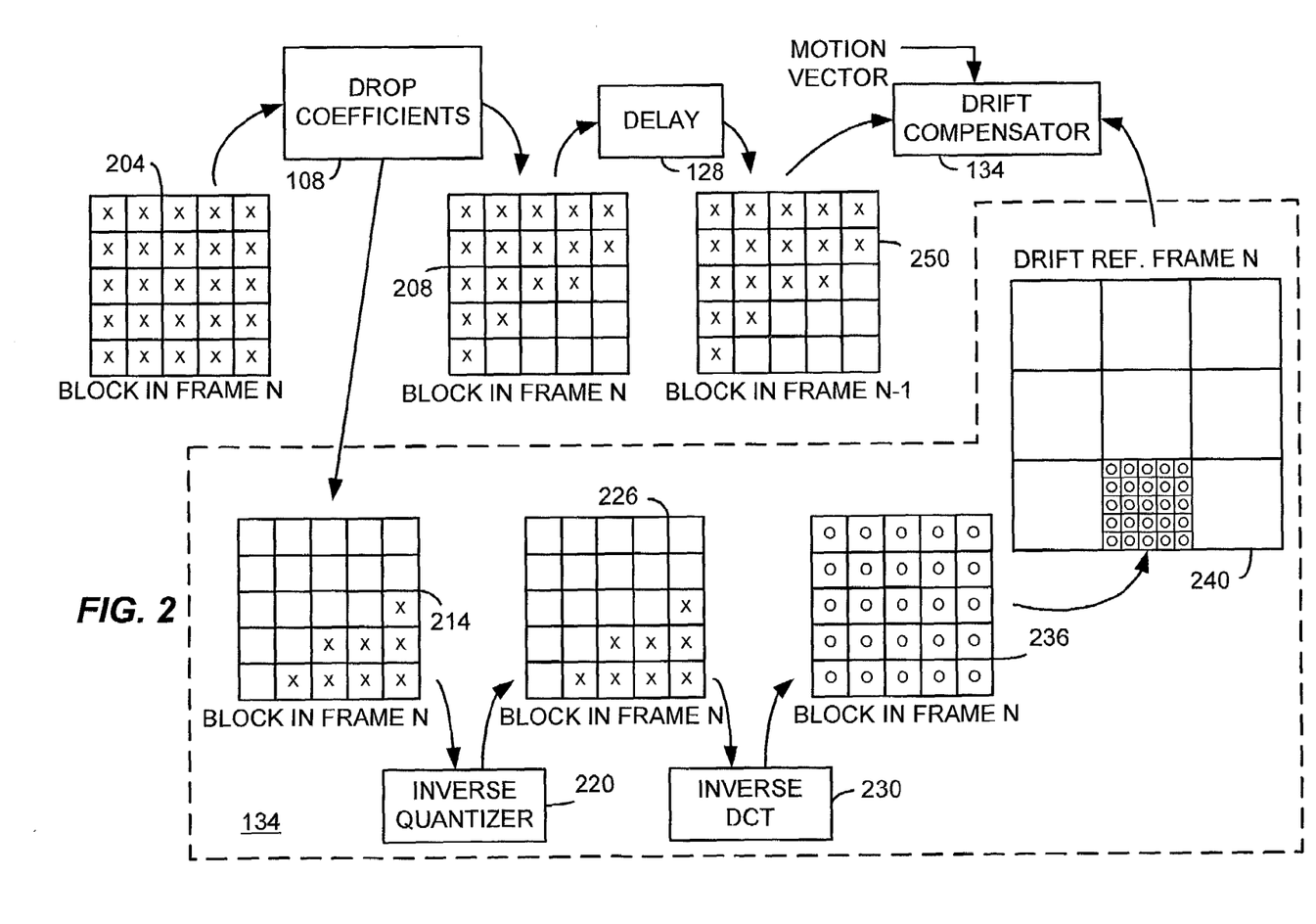
FIG. 2 depicts generation of a drift reference frame in an embodiment consistent with the present invention.

The basic elements of the drift reduction block 120 of the present invention are the drift reference frame creator 124 and the drift compensator 134. To understand how they actually function, they will initially be considered separately. FIG. 2 illustrates the creation of the drift reference frame in greater detail. In this figure, an X in a box within a block indicates that there is a coefficient in the DCT domain residing in that position. A blank box in the block indicates that the coefficient has been dropped. A box with a circle inside represents a drift reference coefficient that has been created for use in the drift reference frame. The use of a single designator such as the circle or the X should not be construed to mean that each box contains the same value coefficient.

Block 204 is a block of variable length decoded video in a frame (frame N) that is applied to coefficient dropper 108. The coefficient dropping processor 108 produces block 208 in which the high frequency coefficients have been dropped to reduce the amount of data, as indicated by the blank boxes adjacent the lower right hand corner of the block. In accordance with the present invention, coefficient dropping processor 108 also produces block 214 which is a block of coefficients that were dropped to produce block 208. Thus, as illustrated, there is one coefficient present in block 214 in each of the boxes where the coefficients have been dropped to form block 208. The coefficients of block 214 are then inverse quantized by an inverse quantizer 220 to produce the inverse quantized block 226.

This block 226 is then inverse discrete cosine transformed using an inverse discrete cosine transformer 230 to produce block 236 containing coefficients in the pixel domain that are then stored as one block of a drift reference frame 240. This process is repeated for each block in frame N to create a complete drift reference frame. This drift reference frame is then used in the drift compensator 134 as will be described shortly.

Since the drift error problem mainly results from the dropped DCT coefficients, the drift reference block 236 is created by storing those pixels in spatial domain. Block 236 can then be used to compensate for the drift. As shown in FIG. 2, the coefficients that are dropped are inverse quantized into block 226, and then inverse DCT transformed into pixel values, as shown in block 236. At this point, the drift is defined in the spatial domain (the pixel domain). For each block (macro-block), the above drift reference process is conducted to form a drift reference frame that can be used to compensate for drift.

Figure 3:
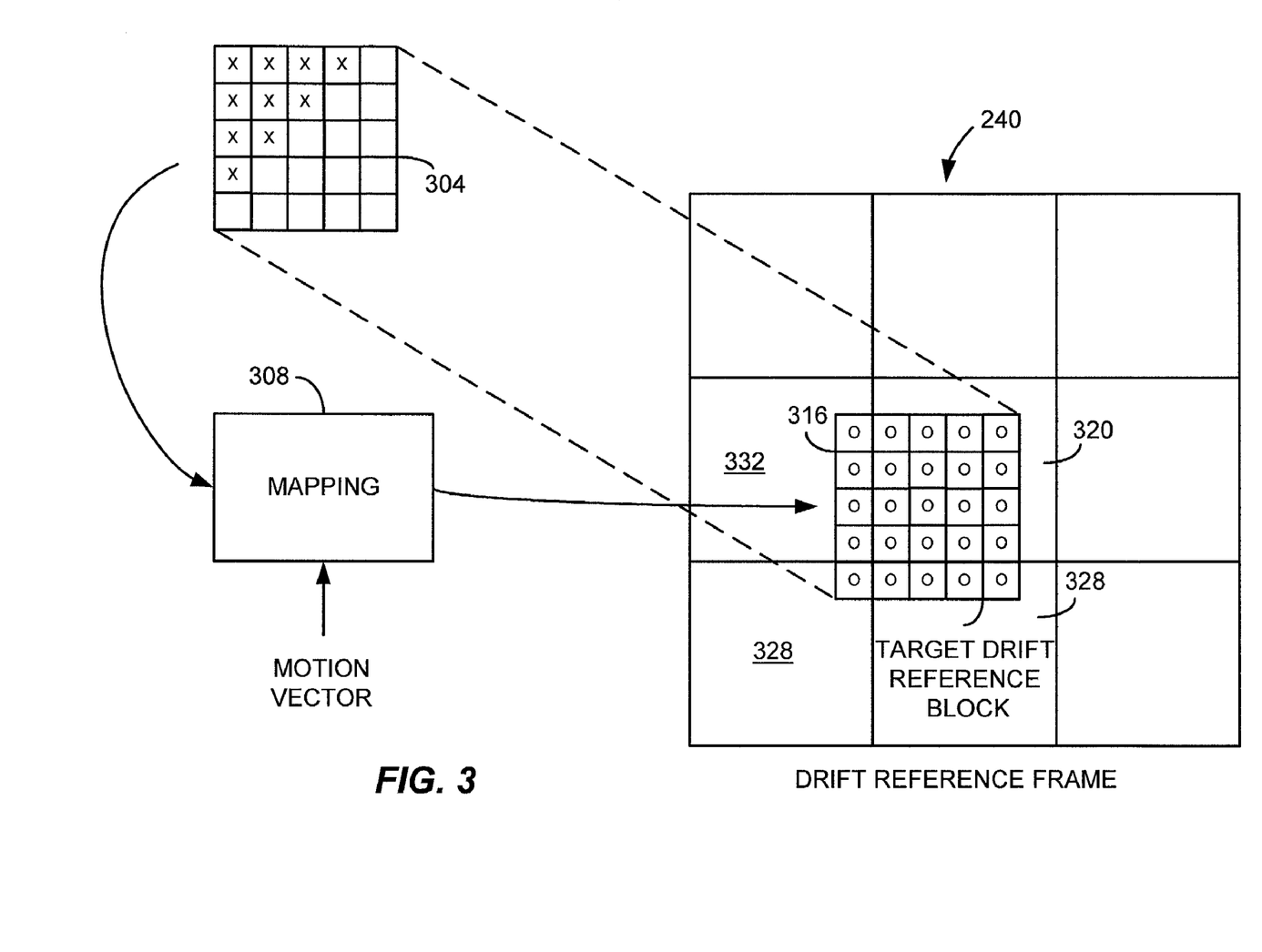
FIG. 3 depicts mapping the drift reference block to a block of video to be compensated in an embodiment consistent with the present invention.
Figure 4:
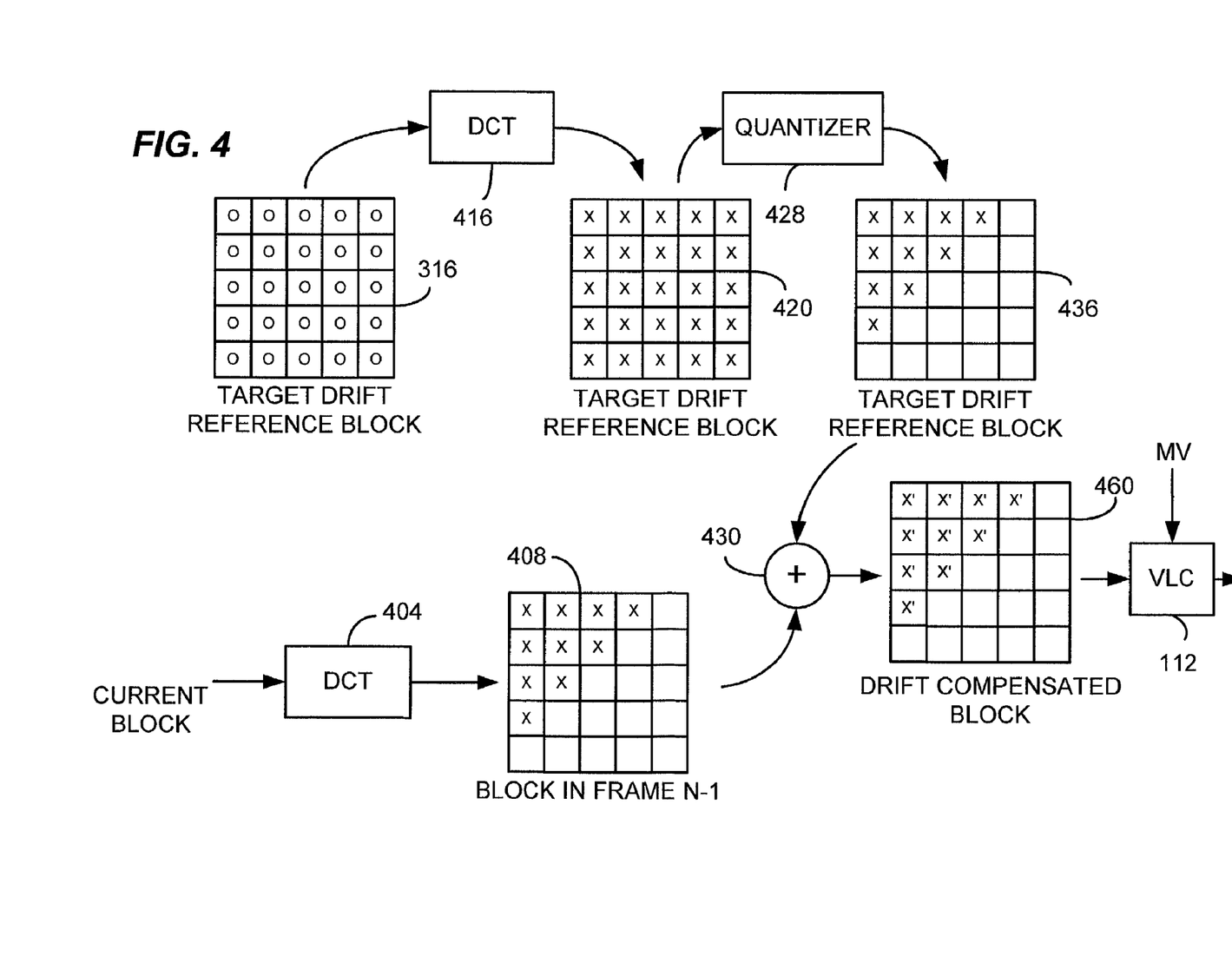
FIG. 4 depicts drift compensation in an embodiment consistent with the present invention.

The above process is used to create a drift reference frame without regard for whether the frame is an MPEG I or P frame. Once drift reference frame 240 has been completed, it can be utilized to compensate for drift. As illustrated in FIG. 1 and FIG. 2, the drift reference frame 240, by virtue of delay 128, is applied to blocks in frame N+1 shown as 250 to achieve this drift compensation. This is accomplished as illustrated in FIGS. 3 and 4.

In MPEG video, except for situations involving a scene change, a video frame generally is very similar to adjacent video frames. That is, in a moving picture, realistic movement is represented by a sequence of image frames that vary slightly from a preceding frame. In order to achieve high levels of data compression, objects that simply move with very little change need not be coded for each video frame. Rather, the object can be coded once and then represented in other video frames by a motion vector MV(x,y) describing the movement of the object. This concept is utilized in drift compensator 134, as illustrated in FIG. 3, by mapping a block 304 to be compensated using a mapping defined by the motion vector at 308 to a corresponding target drift reference block 316 in drift reference frame 240. As illustrated, the target drift reference block 316 is situated slightly lower and to the left of the center of drift reference block 320 and encompasses drift compensation coefficients from drift reference block 320, 324, 328 and 332.

Once the current block 304 has been mapped to a target drift reference block 316, the current block 304 can be drift compensated. This process is illustrated in FIG. 4 with the current block (a block in frame N+1) being passed through a discrete cosine transformer 404 to produce a discrete cosine transformed block 408. The target drift reference block 316 is also discrete cosine transformed by a discrete cosine transformer 416 to create a transformed target drift reference block 420 in the DCT domain. A coefficient dropping processor 428 is used to drop coefficients in the target drift reference block 420 to produce drift reference block 436. Quantized target drift reference block 436 is quantized to drop the DCT coefficients corresponding to those of block 408. Block 408 can then be simply added with block 436 at adder 450 to produce a drift compensated block 460 with the compensated coefficients indicated by X'. This drift compensated block can then be variable length coded by variable length coder 112 to produce the output transcoded MPEG bitstream.

Of course, those skilled in the art will recognize that the drift compensation just described is only carried out for P frames of video and not for I frames of video which represent fully coded frames that are not dependent on other frames and motion vectors to create. However, drift reference frames are created for I frames as well as P and B frames so that other frames dependent upon the I frame as a reference can utilize the drift reference frame in the manner described. The process as previously described for a creation of the drift reference frame can be summarized as process 500 of FIG. 5 starting at 502. At 506 a new frame of variable length decoded MPEG video having blocks of DCT coefficients is received. For each block in the frame at 510, high frequency coefficients are removed from the block to quantize the block at 516.

Figure 5:
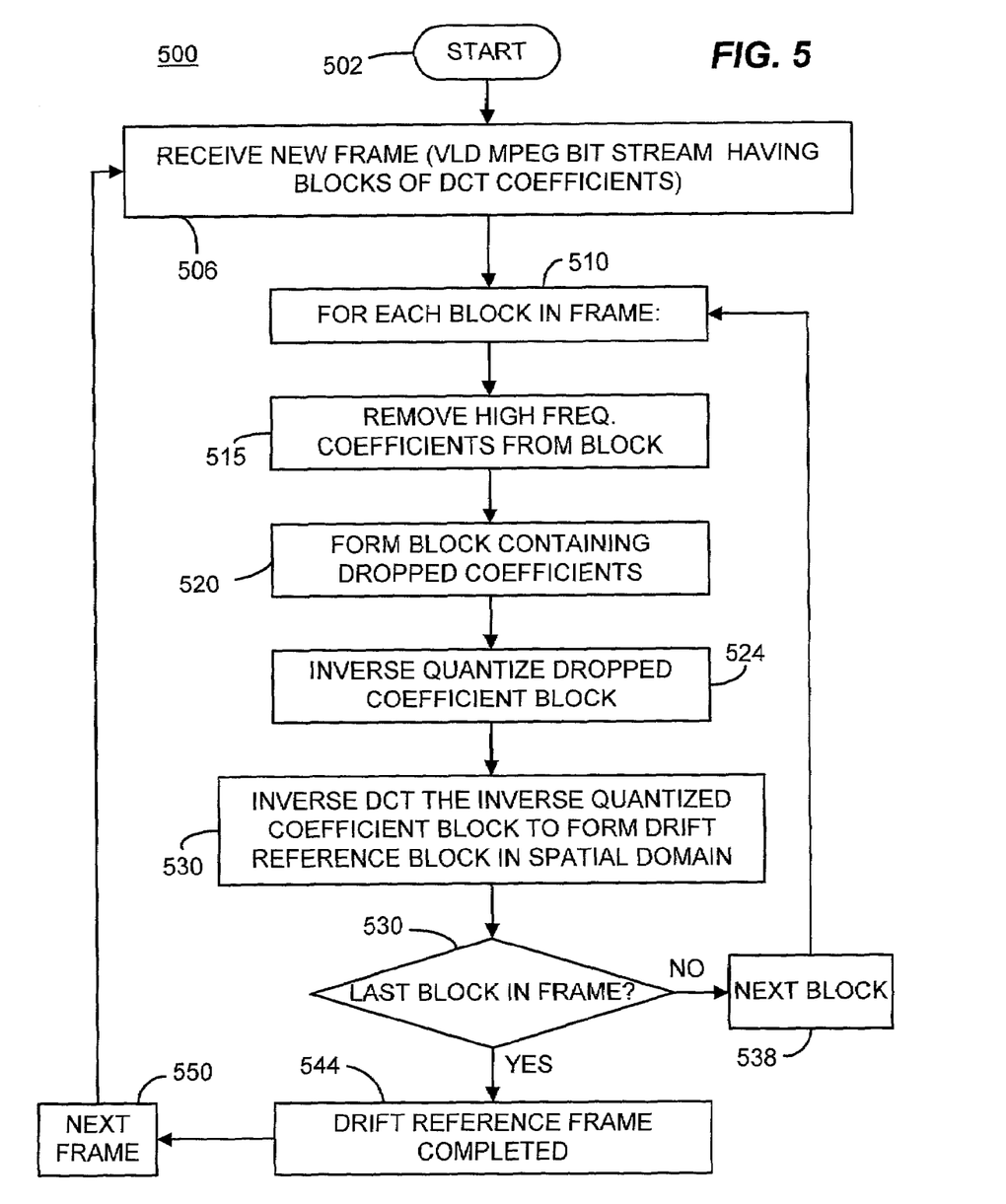
FIG. 5 is a flow chart describing one embodiment consistent with the present invention for creation of a drift reference frame.

A block is formed containing the dropped coefficients at 520 and inverse quantized at 524. The inverse quantized block is then inverse discrete cosine transformed at 530 to produce a drift reference block in the spatial (pixel) domain. If this is not the last block in the frame at 534 the next block is selected at 538 and the process returns to 510. When the last block in the frame has been reached at 534, then the drift reference frame is completed at 544 and the process moves on to the next frame at 550. Control returns to 506 for receipt of the new frame.

The drift compensation process described previously is summarized as process 600 of FIG. 6 starting at 602. At 606, a new frame of variable length decoded MPEG data is received and it is inspected at 610 to determine if it is either a P or a B frame. If not, the frame is simply variable length coded in a conventional manner at 614 and the process moves to the next frame at 618. Control then returns to 606. If the frame is either a P or a B frame at 610, then for each block in the frame at 620, motion vectors are inspected to see if the block relates to a block in a prior (or any other referenced frame) frame. If not, control passes to 630 to determine if it is the last block in the frame. If not, the process moves to the next block at 634 and control returns to 620. If a motion vector points to a block in another frame at 624 which corresponds to the current block, then the corresponding drift reference block is retrieved at 640 and the corresponding drift reference block is discrete cosine transformed at 644.

Figure 6:
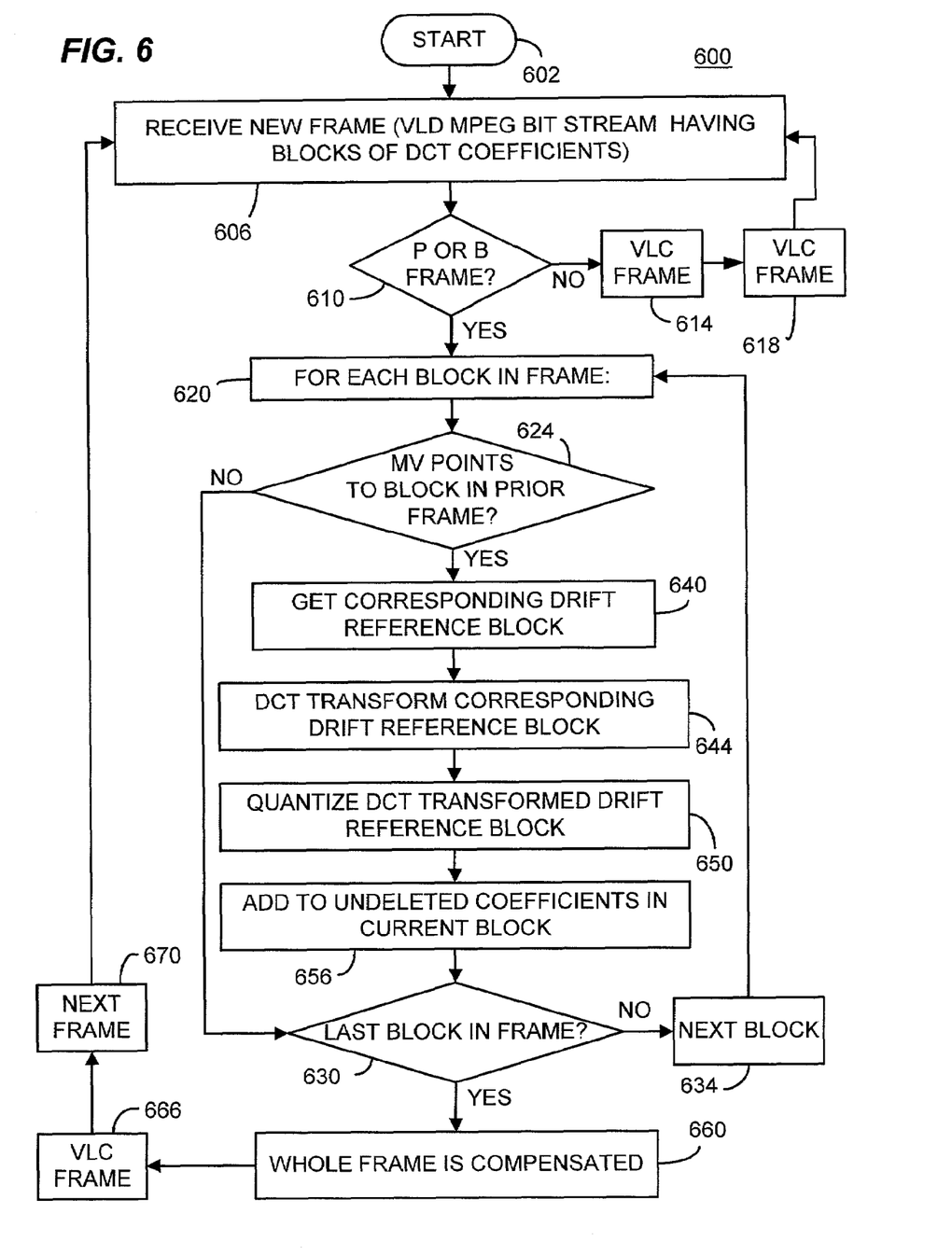
FIG. 6 is a flow chart consistent with an embodiment of the invention for compensation for drift using the drift compensation frame created in process 500 of FIG. 5.

The discrete cosine transformed drift reference block is then quantized at 650 to create a target drift reference block that matches the quantization index of the current block and the quantized discrete cosine transformed drift reference block is added to the current block at 656. Control then passes to 630 to determine if another block is to be processed in this frame. When the last block has been processed in the frame at 630 then the entire frame is compensated at 660 and the frame can be variable length coded at 666 before proceeding to the next frame at 670 and passing control back to 606.

To evaluate the performance of the above drift reduction method, a simulation was conducted as follows: Pixel values in the range of 110 to 150 are randomly selected to form a 16×16 frame as a reference frame, and an 8×8 block is similarly generated to form a current block with its motion vector MV(x,y), where x and y both are set at 3 for simplicity. Note that the motion vector in this simulation is not necessarily pointing to the best-matched block in the reference frame. Also assume the cut-off point for the DCT coefficients dropping in higher frequencies is 10. i.e., only ten DCT coefficients are retained. Any reduction in drift will produce an associated improvement in PSNR (Peak Signal to Noise Ratio). Thus, PSNR values of the current block without any drift reduction and with the above drift reduction method are then compared. The results of the simulation is shown in TABLE 1 with each PSNR value in the table representing the average value over 5000 simulation runs.

TABLE 1

| # of retained DCT coefficients | PSNR without Drift Reduction | PSNR with Drift Reduction |
| --- | --- | --- |
| 4 | 19.16 | 19.71 |
| 6 | 18.47 | 19.73 |
| 8 | 18.26 | 19.47 |
| 10 | 15.39 | 18.78 |
| 12 | 15.52 | 18.92 |

Thus, in this simulation, the present drift reduction method reduced drift to produce improvement of between approximately 0.55 and 3.4 dB in Peak Signal to Noise Ratio, depending upon the number of DCT coefficients retained.

Those skilled in the art will recognize that the present invention has been described in terms of exemplary embodiments based upon simulations using a programmed processor. However, the invention should not be so limited, since the present invention could be implemented using hardware component equivalents such as special purpose hardware and/or dedicated processors such as dedicated MPEG chips which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage including, but not limited to Read Only Memory (ROM) devices, Random Access Memory (RAM) devices, optical storage elements, magnetic storage elements, magneto-optical storage elements, flash memory, core memory and/or other equivalent storage technologies without departing from the present invention. Such alternative storage devices should be considered equivalents.

The present invention can be implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, and additional operations can be added or operations deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of reducing drift in a block of quantized MPEG discrete cosine transform coefficients, comprising:
   computing a drift reference block of discrete cosine transform coefficients;
   mapping the drift reference block to a block of quantized video coefficients, the block of quantized discrete cosine transformed video coefficients having at least one dropped coefficient using a motion vector; and
   adding the coefficients of the drift reference block to the coefficients of the block of quantized video coefficients that have not been blocked to form a drift compensated block.

2. The method according to claim 1, further comprising variable length coding the drift compensated block.

3. The method according to claim 1, further comprising repeating the computing, mapping and adding for each motion vector in a frame of MPEG video.

4. The method according to claim 1, wherein the computing is carried out by:
   forming a dropped coefficient block containing at least one coefficient dropped in quantizing the block of quantized MPEG discrete cosine transform coefficients;
   inverse quantizing the at least one coefficient to produce an inverse quantized dropped coefficient block; and
   inverse discrete cosine transforming the inverse quantized dropped coefficient block to produce the drift reduction block.

5. The method according to claim 4, further comprising discrete cosine transforming the block of coefficients in the drift reduction block.

6. The method according to claim 5, further comprising quantizing the discrete cosine transformed block of coefficients in the drift reduction frame.

7. The method according to claim 4, wherein the at least one dropped coefficient comprises at least one high frequency coefficient.

8. An MPEG transcoder, comprising:
   a variable length decoder (VLD) receiving an MPEG bitstream and produces variable length decoded video frames and motion vectors that characterize movement of objects in the video frames;
   a processor that processes the frames of VLD decoded video by dropping high frequency discrete cosine transform coefficients in blocks of data;
   a drift reference frame creator that creates a drift reference frame by, for each block in the video frame:
      processing a block of discrete cosine transform coefficients by deleting at least one coefficient in the block;
      forming a dropped coefficient block containing the at least one coefficient;
      inverse quantizing the at least one coefficient to produce an inverse quantized dropped coefficient block; and
      inverse discrete cosine transforming the inverse quantized dropped coefficient block to produce the drift reduction block;
   a drift compensator that compensates for drift in video blocks in the frame by, for each motion vector pointing to the frame:
      using the motion vector, mapping a block in the drift reference frame to a block of quantized discrete cosine transformed video coefficients having at least one dropped coefficient;
      discrete cosine transforming the block of coefficients in the drift reduction block; and
      adding the coefficients of the drift reference block to the coefficients of the block of quantized video coefficients that have not been dropped to form a drift compensated block; and
   variable length coding the drift compensated block.

9. The method according to claim 8, wherein the at least one deleted coefficient comprises at least one high frequency coefficient.

10. An electronic storage medium storing instructions which, when executed on a programmed processor, carry out a method of reducing drift in a block of quantized MPEG discrete cosine transform coefficients, comprising:
    computing a drift reference block of discrete cosine transform coefficients;
    mapping the drift reference block to a block of quantized video coefficients, the block of quantized discrete cosine transformed video coefficients having at least one dropped coefficient using a motion vector; and
    adding the coefficients of the drift reference block to the coefficients of the block of quantized video coefficients that have not been blocked to form a drift compensated block.

11. The electronic storage medium according to claim 10, wherein the method further comprises variable length coding the drift compensated block.

12. The electronic storage medium according to claim 10, wherein the method further comprises repeating the computing, mapping and adding for each motion vector in a frame of MPEG video.

\* \* \* \* \*